(12) United States Patent
Phan et al.

(10) Patent No.: US 11,313,406 B2
(45) Date of Patent: Apr. 26, 2022

(54) CAPTIVE FASTENER WITH PUSH OUT CAM AND HOLD OUT CLIP

(71) Applicant: FASTENER TECHNOLOGY CORPORATION, North Hollywood, CA (US)

(72) Inventors: Benjamin Phan, Arcadia, CA (US); Simon Ly, Rosemead, CA (US); An Tran, Rosemead, CA (US); Patrick Tran, Arcadia, CA (US); Yuriy Bern, No. Hollywood, CA (US); Larisa Zilber, Northridge, CA (US); Jeffrey Hang, Rosemead, CA (US); Dennis Suedkamp, Porter Ranch, CA (US)

(73) Assignee: FASTENER TECHNOLOGY CORPORATION, North Hollywood, CA (US)

( * ) Notice: Subject to any disclaimer, the term of this patent is extended or adjusted under 35 U.S.C. 154(b) by 231 days.

(21) Appl. No.: 16/837,172

(22) Filed: Apr. 1, 2020

(65) Prior Publication Data
US 2020/0392981 A1  Dec. 17, 2020

Related U.S. Application Data

(60) Provisional application No. 62/861,171, filed on Jun. 13, 2019.

(51) Int. Cl.
*F16B 21/18*  (2006.01)
*F16B 41/00*  (2006.01)
*F16B 5/02*  (2006.01)

(52) U.S. Cl.
CPC .......... *F16B 41/002* (2013.01); *F16B 5/0208* (2013.01)

(58) Field of Classification Search
CPC ...................................... F16B 41/002
USPC ................. 411/322, 110–112, 107, 337, 347
See application file for complete search history.

(56) References Cited

U.S. PATENT DOCUMENTS

| | | | | |
|---|---|---|---|---|
| 1,679,474 A | * | 8/1928 | Kenton | F16B 39/06 411/322 |
| 3,055,015 A | * | 9/1962 | Silverman | E05D 7/009 4/240 |
| 3,079,829 A | * | 3/1963 | Chester | B25B 31/005 411/347 |
| 3,933,390 A | * | 1/1976 | Barrett | B63C 7/16 294/94 |
| 4,112,992 A | * | 9/1978 | Wing | F16B 39/04 411/190 |
| 4,119,131 A | * | 10/1978 | Cosenza | F16B 39/20 411/352 |
| 4,759,671 A | * | 7/1988 | Duran | F16B 21/086 411/347 |
| 5,082,406 A | * | 1/1992 | Cosenza | F16B 5/0208 403/408.1 |

(Continued)

*Primary Examiner* — Gary W Estremsky
(74) *Attorney, Agent, or Firm* — Fulwider Patton LLP

(57) ABSTRACT

A captive fastener is disclosed having a longitudinal slot along the shank for receiving a hold-out clip, and a chamber that houses a retractable cam member. The cam member is spring actuated to extend out of the shank and can be retracted into the cavity against the bias of the spring to pass through a primary panel and subpanel. The cam member is shaped to counter-rotate in the presence of a traverse force, such as the panel bearing against it.

7 Claims, 6 Drawing Sheets

(56) References Cited

U.S. PATENT DOCUMENTS

| | | | | |
|---|---|---|---|---|
| 5,226,767 | A * | 7/1993 | Foerster, Jr. | E04F 13/0832 |
| | | | | 411/340 |
| 8,641,344 | B1 * | 2/2014 | Avetisian | F16B 39/32 |
| | | | | 411/347 |
| 2006/0182514 | A1 * | 8/2006 | Ito | F16B 35/00 |
| | | | | 411/340 |
| 2008/0003077 | A1 * | 1/2008 | Anderson | F16B 19/109 |
| | | | | 411/347 |
| 2017/0234357 | A1 * | 8/2017 | Hsieh | F16B 5/0241 |
| | | | | 411/322 |

* cited by examiner

CAPTIVE FASTENER WITH PUSH OUT CAM AND HOLD OUT CLIP

CROSS-REFERENCES TO RELATED APPLICATIONS

This application claims priority from U.S. Provisional Patent Application No. 62/861,171, filed Jun. 13, 2019, the content of which is incorporated by reference herein in its entirety.

BACKGROUND

Captive screws are used for many applications, including securing panels and walls where it is challenging to access the opposite side of the screw assembly. Captive screw assemblies are typically comprised of a captive screw, along with flat washer &/or lock washer or retainer. Threads on captive screws are eliminated under the head for a portion of the length, so that once the threaded portion extends through a panel with a washer on the other side, the screw will not fall out. Captive screws are most often used to secure panels because, if loosened, the fastener will still remain in the panel. When coupled with a lock washer and/or captive washer, they provide a broader fastening surface to the panel, while inhibiting the screw from counter-rotating. Also, if provided with a retainer, the assembly may be held into the panel by pressing or swaging the retainer, such that the screw is prevented from falling out by the retainer.

The present invention is a specialized captive fastener that can work with a counterbore to secure the fastener from the opposite side of a panel, and also allows the fastener to enter a subpanel.

SUMMARY OF THE INVENTION

The present invention is a captive fastener such as a threaded bolt or screw with an elongate slot along the shank through which a cantilevered hold-out clip extends. The shank further comprises a cavity that houses a retractable cam member. The cam member is spring actuated to extend out of the shank and can be retracted into the cavity against the bias of the spring for clearance to allow the fastener to pass through a primary panel and a subpanel. The cam member is shaped to counter-rotate in the presence of a traverse force, such as the panel bearing against it. These, and other features of the invention will best be understood with reference to the figures and the detailed description of the invention below.

DETAILED DESCRIPTION OF THE PREFERRED EMBODIMENTS

The present invention relates to a captive fastener with a spring actuated cam and a hold-out clip.

Figure 1:
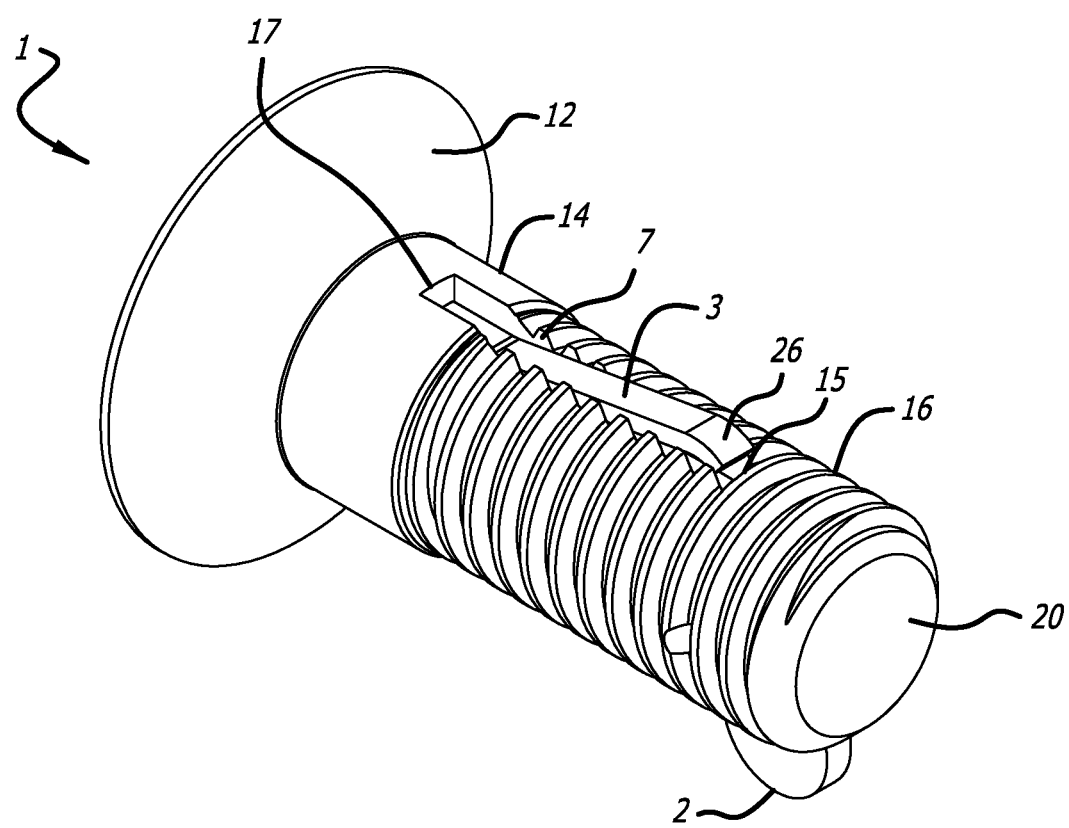
FIG. 1 is an elevated, perspective view of a first embodiment of the present invention.

FIG. 1 illustrates a first preferred embodiment of the present invention, comprising a fastener 1 having a head 12, a neck 14, and a threaded shank 16. The shank 16 is formed with an elongate slot 7 extending from a position 15 spaced from the end 20 of the shank to a position 17 just beyond the juncture of the neck 14 and shank 16, the elongate slot 7 being is sized to receive and retain a hold-out clip 3. The hold-out clip 3 is cantilevered at a first end 24 and has a free end 26 that slightly protrudes from the slot 7 and acts as a leaf spring to apply a radial outward force against an interfering structure.

Figure 2:
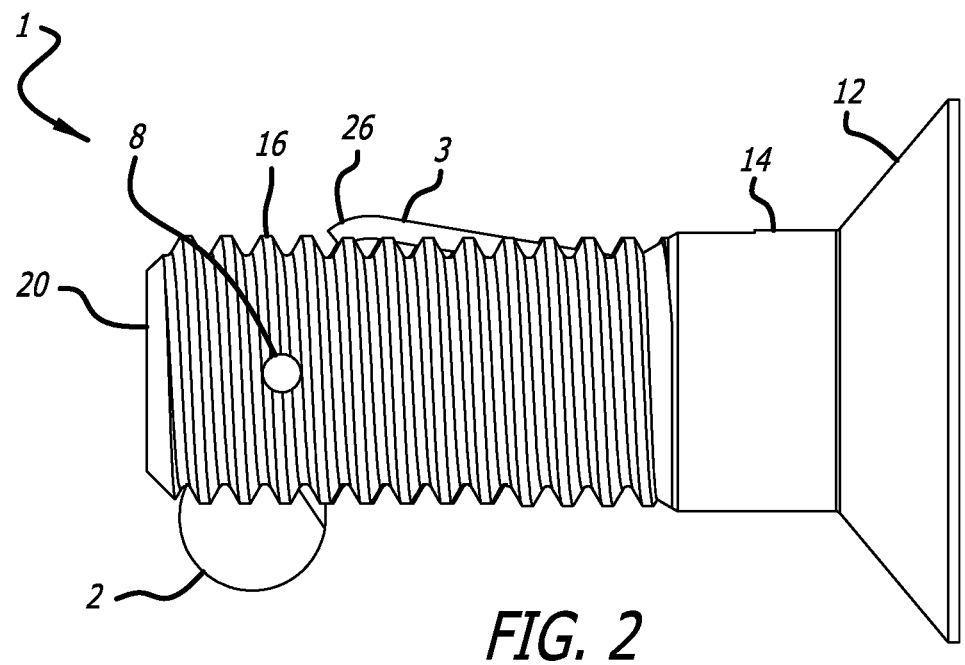
FIG. 2 is a front view of the embodiment of FIG. 1.
Figure 3:
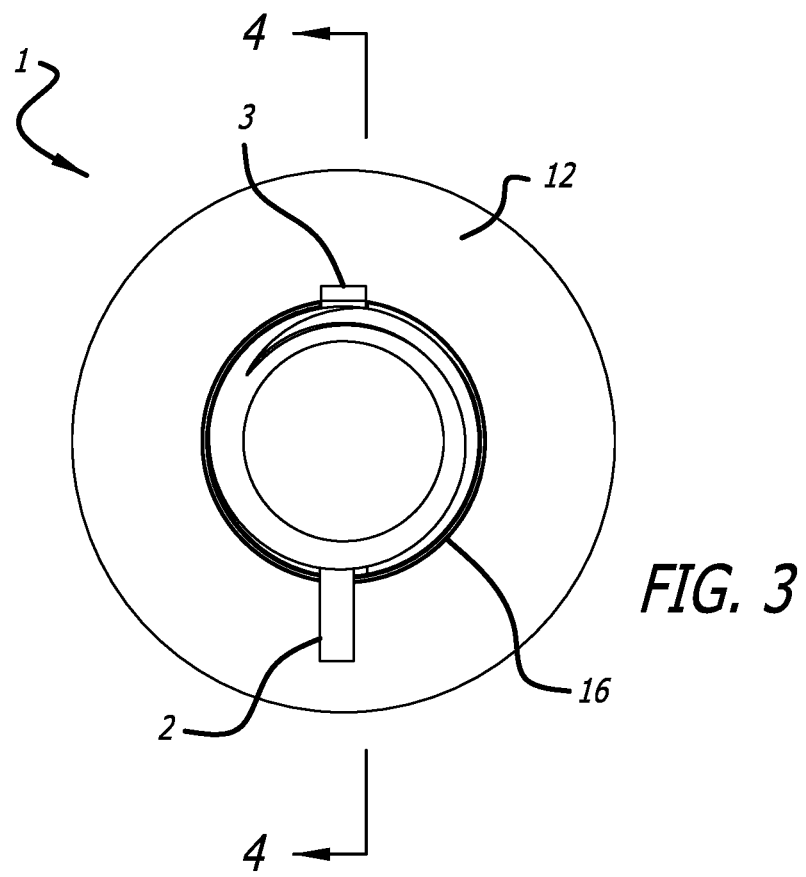
FIG. 3 is a side view of the embodiment of FIG. 1.

FIG. 2 illustrates the embodiment of FIG. 1 from the front view, showing the free end 26 of the hold-out clip 3 protruding radially from the shank 16 of the fastener 1. A pin hole 8 passes through the shank 16 and supports a roll pin 4 discussed below. Additionally shown is a cam member 2 that is rotatably supported on the roll pin 4. FIG. 3 shows the view looking down the shank 16, where the hold-out clip 3 and the cam member 2 are shown diametrically separated (i.e., extend radially in a common plane), although this is not necessary for the invention to operate.

Figure 4A:
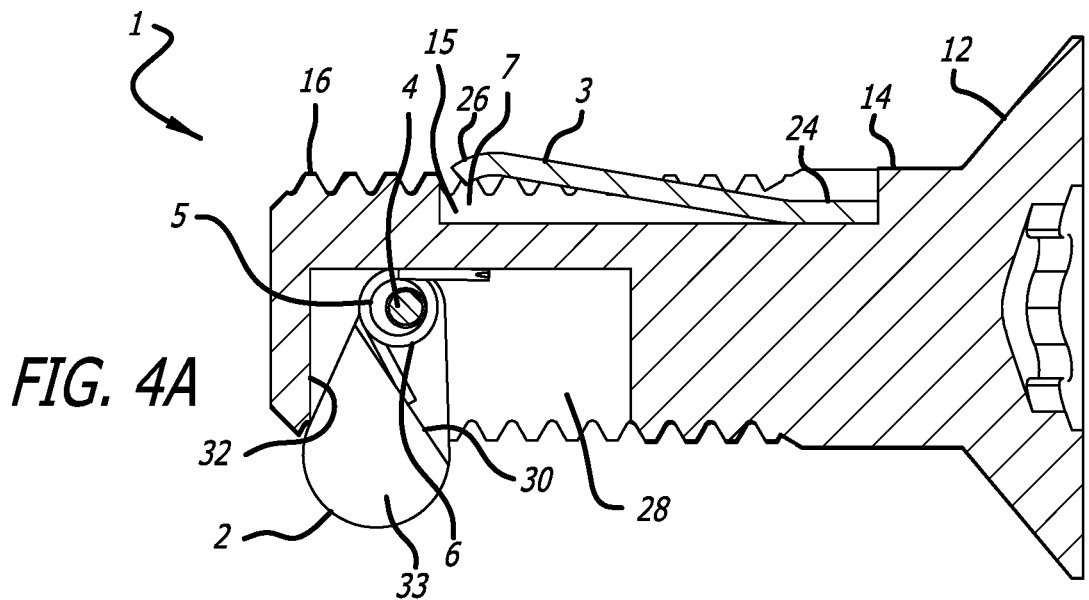
FIG. 4A is a cross-sectional view of the embodiment of FIG. 3 taken along line A-A of FIG. 3.
Figure 4B:
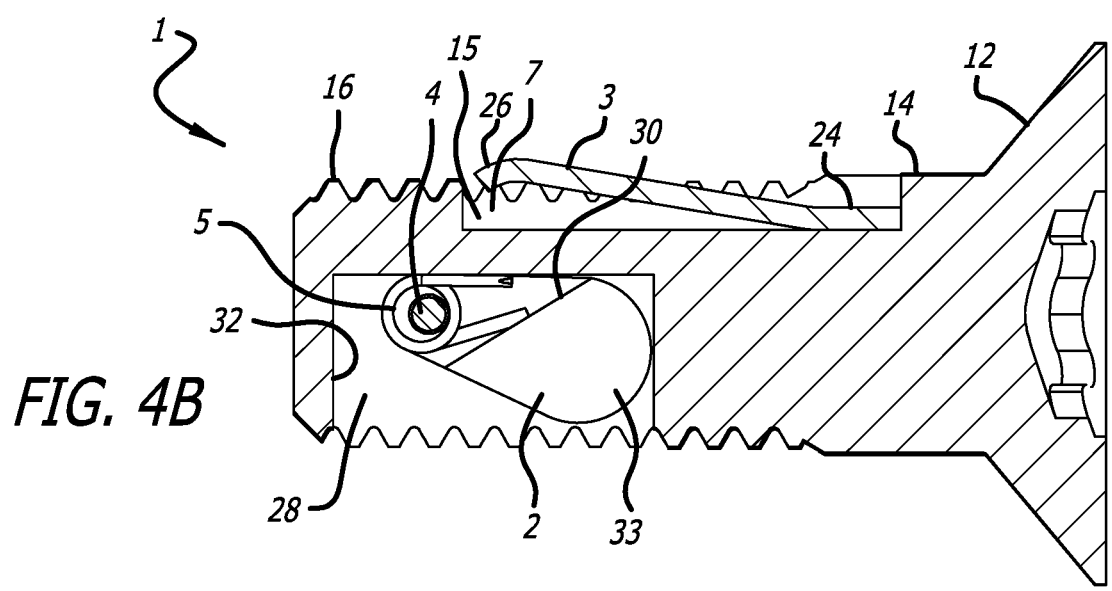
FIG. 4B is a cross-sectional view of the embodiment of FIG. 3 taken along a line transverse to line A-A.

FIGS. 4A,B are cross sectional views that illustrates the components of the cam member 2 within a chamber 28. The cam member 2 is biased through a torsional spring 5 at a shoulder 30 defined by an oblique surface, the spring 5 biasing the cam's substantially circular end 33 out of the chamber 28 about the roll pin 4 spanning the chamber 28 in FIG. 4A. The depth of the chamber 28 is sized to accommodate the entire cam member 2 when the cam member 2 is rotated against the bias of the torsional spring 5 (FIG. 4B). A distal side 32 of the chamber 28 establishes a stop on the rotation of the cam 2, orienting the cam 2 substantially perpendicular to the axis of the shank 16 in the absence of any outside forces as shown in FIG. 4A. The configuration of the hold-out clip 3 within the slot 7 is also shown in FIG. 4A,B, where the depth of the slot 7 is adequate to allow the clip 3 to withdraw into the slot 7 in the presence of a radial force.

Figure 5:
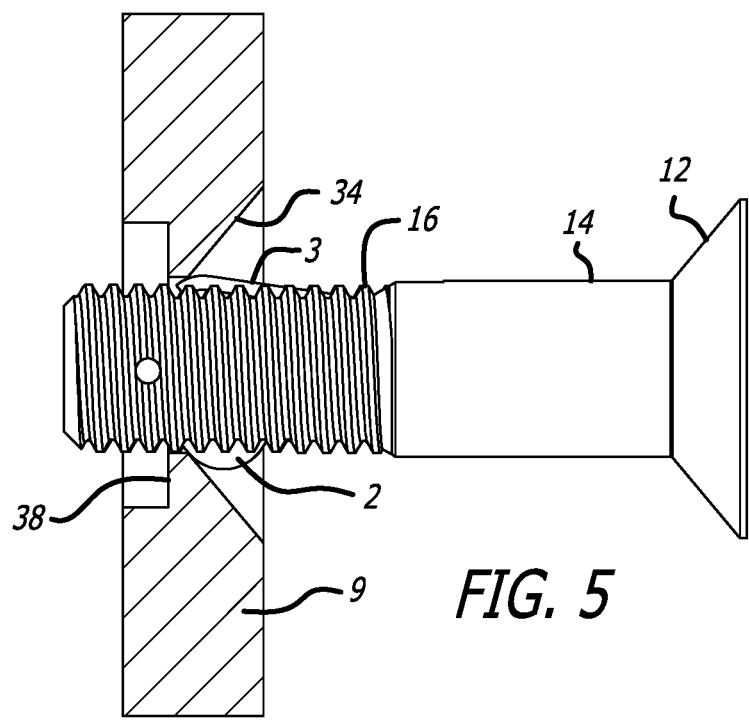
FIG. 5 is a front view, partially in cut-away, of the embodiment of FIG. 1 entering a panel.
Figure 10:
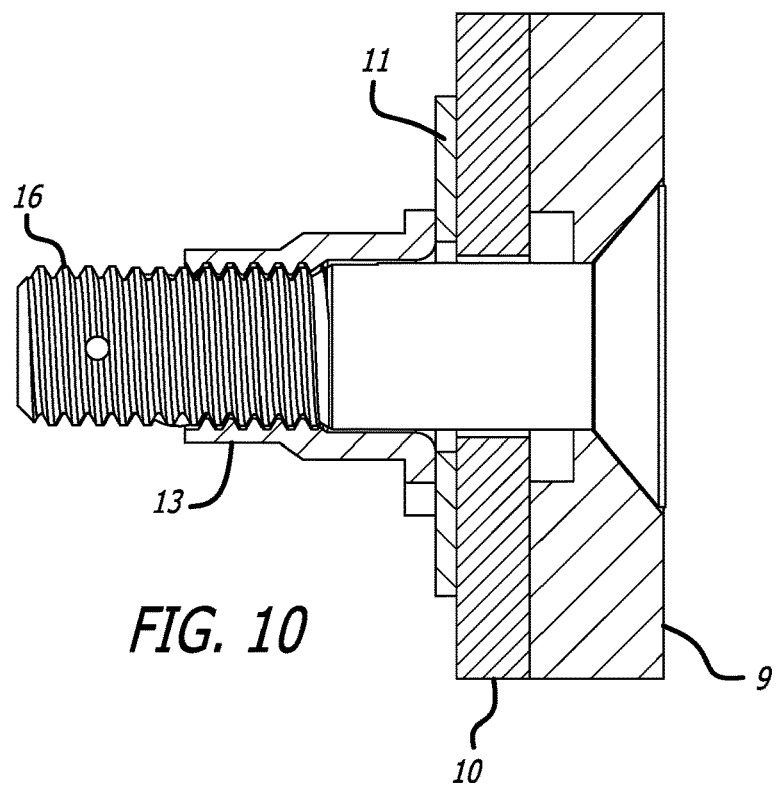
FIG. 10 is a front view, partially in cut-away, of the installed fastener of FIG. 1.

FIGS. 5 10 illustrate the operation of the present invention. FIG. 5 shows the fastener 1 inserted into a primary or top panel 9 that may have a beveled recess 34 to receive the head 12 of the fastener 1. Opposite the beveled recess 34 is a counterbore 36, and in between the counterbore 34 and the beveled recess 34 is a circular aperture sized to receive the neck 14 of the fastener 1. As the fastener enters the beveled recess 34 and passes through the circular aperture, the bowed shape of the hold-out clip 3 interferes with the inner surface of the circular aperture and drives the hold-out clip 3 into the slot 7 against the bias of the clip 3. Similarly, the inner surface of the circular aperture of the panel make contact with the cam member 2 and causes the cam member to counter-rotate against the bias of the torsional spring 5 and recede into the chamber 28. The receding of the cam member 2 and the clip 3 into the chamber 28 and slot 7, respectively, permits the fastener 1 to enter and pass through the panel 9.

Figure 6:
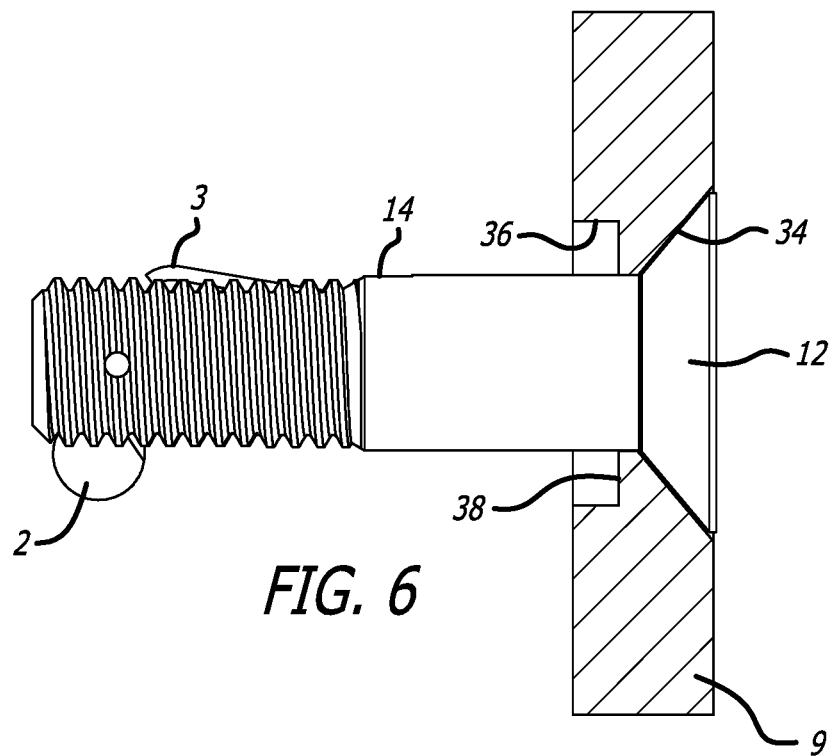
FIG. 6 is a front view, partially in cut-away, of the embodiment of FIG. 1 having passed through the panel.

FIG. 6 illustrates the fastener 1 after it passes through the panel 9. The hold-out clip 3 has returned to its position partially outside of the slot 7, and the cam member 2 has rotated under the influence of the torsional spring 5 to the radially extended position outside of the chamber 28. The head 12 of the fastener 1 is engaged and mated with the beveled recess 34 of the panel 9, such that the shank extends from the side of the panel substantially perpendicular to the surface 38 of the panel.

Figure 7:
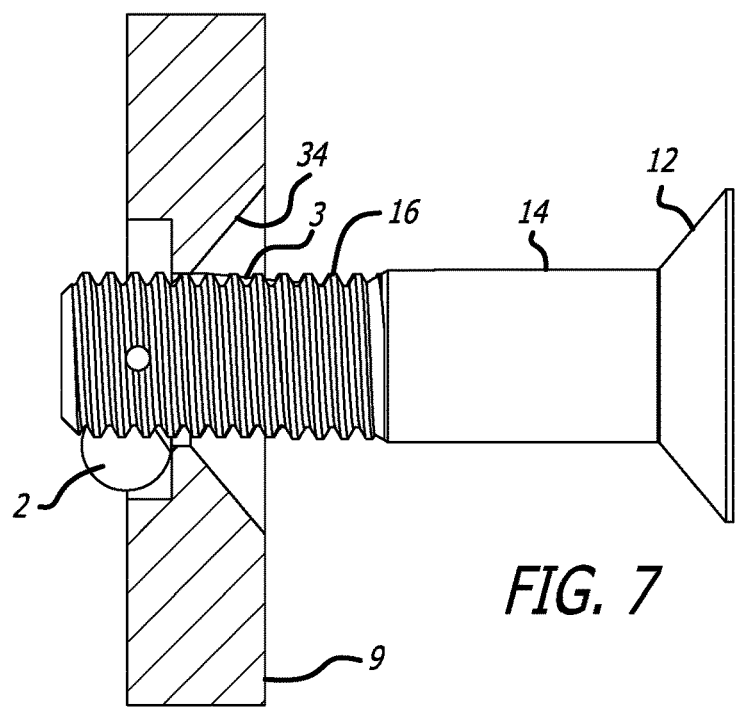
FIG. 7 is a front view, partially in cut-away, of the embodiment of FIG. 1 against the counterbore of the panel.

FIG. 7 illustrates how the hold-out clip 3 can fix the fastener 1 in the circular aperture of the panel by applying an outwardly directed force against the circular aperture. This outward force is sufficient to fix the fastener 1 within the panel and maintain a substantially perpendicular orientation as shown. The cam member 2 bears against the counterbore 36 of the panel 9, fixing the depth of the fastener's position within the panel 9 and establishing a defined length of the shank 16 outside of the panel surface 36.

Figure 8:
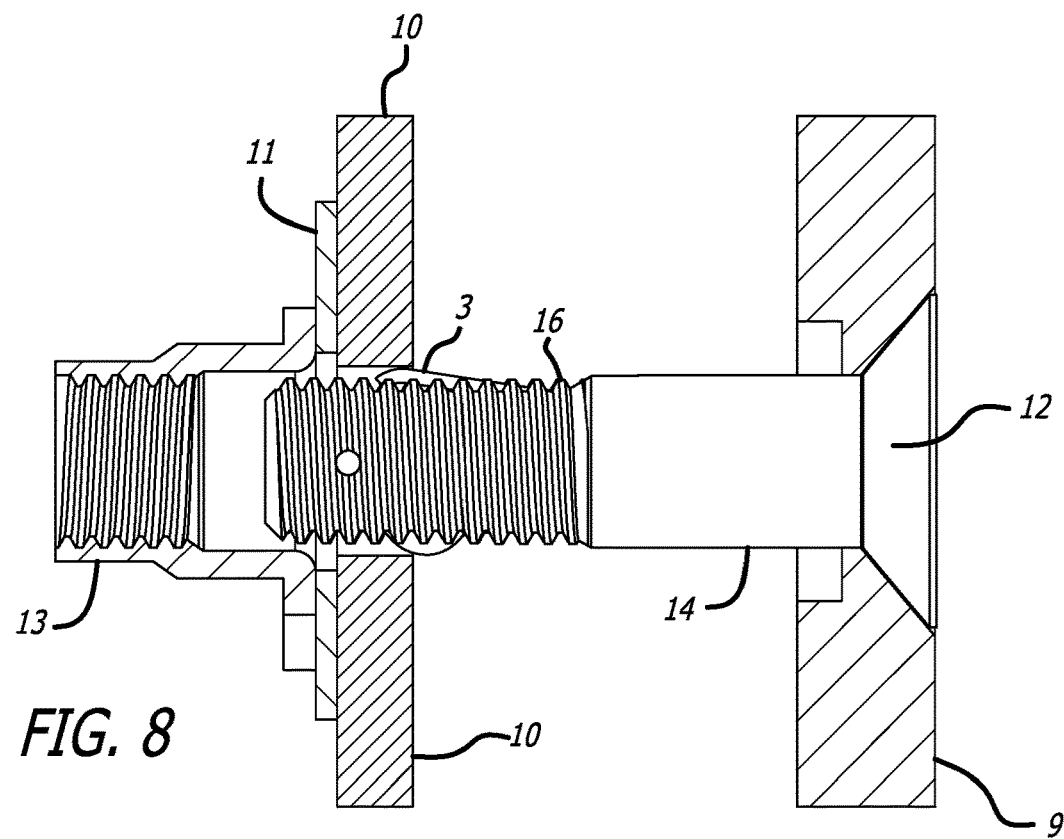
FIG. 8 is a front view, partially in cut-away, of the embodiment of FIG. 1 entering a subpanel.

FIG. 8 illustrates the fastener 1 entering a second panel 10 with a nut bracket 11 and lock nut 12. As with the primary panel 9, the second panel 10 compresses the clip 3 into its slot 7, and the cam member 2 is rotated into the chamber 28. The hold-out clip 3 helps to retain the fastener 1 into the second panel 9.

Figure 9:
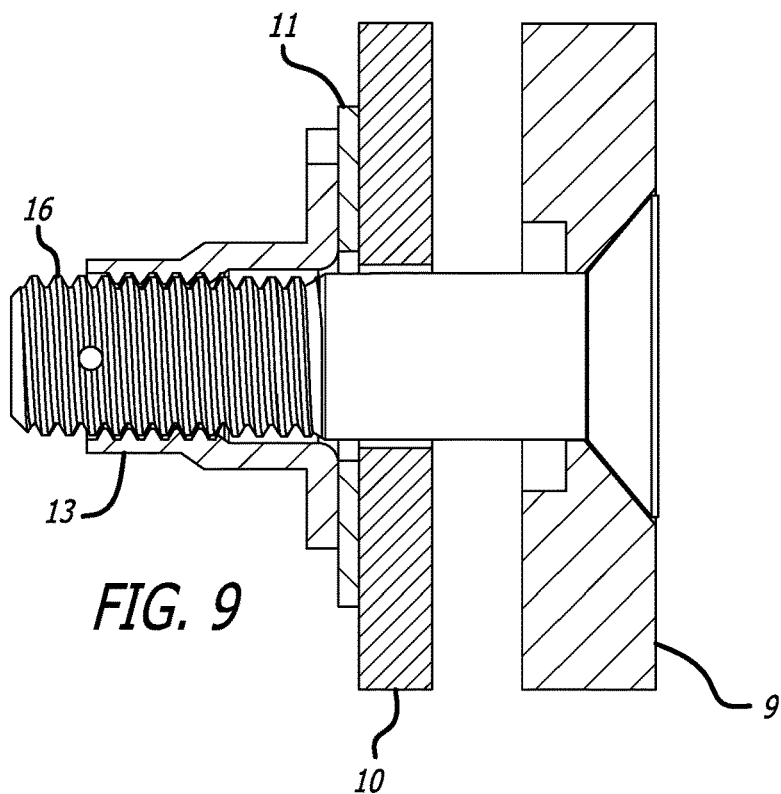
FIG. 9 is a front view, partially in cut-away, of the embodiment of FIG. 1 with nut attached.

FIG. 9 illustrates the progression of the fastener 1 further into the second panel 10, as the nut bracket 11 and lock nut 12 travels along the shank 16. The hold-out clip 3 and cam member 2 are fully receded into their respective slot and chamber allowing the fastener to pass through the second panel 10. Finally, as shown in FIG. 10, the primary panel 9 and second panel 10 are compressed by the fastener 1. The lock nut 12 is fully engaged, and the length of the nut's distal edge prevent the clip 3 and the cam member 2 from extending outside their recesses. Thus, the screw can easily disengage with the nut.

Although a first preferred embodiment has been disclosed and depicted, the invention is not limited to any specific embodiment and should not be limited in any manner unless expressly stated.

We claim:

1. A captive fastener having a head, a neck, and a threaded shaft, the fastener further comprising:
    an elongate longitudinal slot along the threaded shaft retaining a cantilevered hold-out clip partially extending outside the elongate longitudinal slot, said hold-out clip secured at the neck and includes a free end at a distal end of the threaded shaft;
    a rotatable cam member disposed within a chamber in the threaded shaft, the rotatable cam member including a substantially circular end portion biased out of the chamber by a torsional spring, the chamber sized to receive the cam member fully within; and
    a roll pin spanning the chamber and supporting the torsional spring, the roll pin perpendicular to a longitudinal axis of the threaded shank.

2. The captive fastener of claim 1, wherein the elongate longitudinal slot extends from the neck to a distal end of the threaded shaft.

3. The captive fastener of claim 1, wherein the roll pin is distal to the hold-out clip.

4. The captive fastener of claim 1, wherein the rotatable cam and hold-out clip move radially outward in a common plane.

5. The captive fastener of claim 1, wherein the rotatable cam and the hold-out clip do not move in a common plane.

6. The captive fastener of claim 1, wherein the rotatable cam includes an oblique surface with respect to a longitudinal axis of the fastener that engages the torsional spring.

7. The captive fastener of claim 1, wherein the hold-out clip has an angled distal end.

\* \* \* \* \*